Dec. 3, 1929.     B. W. P. COGHLIN     1,738,286

AUTOMOBILE BUMPER

Filed Jan. 10, 1929

INVENTOR.
BERNARD W.P. COGHLIN.

By

ATTORNEY.

Patented Dec. 3, 1929

1,738,286

UNITED STATES PATENT OFFICE

BERNARD W. P. COGHLIN, OF MONTREAL, QUEBEC, CANADA

AUTOMOBILE BUMPER

Application filed January 10, 1929. Serial No. 331,590.

This invention relates to automobile bumpers and particularly to bumpers having forward and rearward spring bars.

The object of the invention is to provide an improved form of three bar bumper, having greater cushioning effect than hitherto in bumpers of this type.

A further object is to provide a bumper of simple construction which can be easily and economically manufactured and assembled.

A further object is to provide in a bumper of this type a central spring connection between the front and rear bars, which greatly assists in absorbing shocks which the bumper is subjected to.

The essential feature of the invention is a short spring bar, with its ends bent back on its middle portion and spread outwardly in opposite directions. The ends are secured to the upper and lower front bars and the middle is secured to the rear bar at its center.

Reference is made to the accompanying drawings in which:—

The bars 1, 2, and 3, have terminal eyes 10, 20, and 30, which are mounted on bolts 4. The outer front bars 1, and 3, are bent forwardly while the middle rear bar 2, is bent rearwardly.

Figure 1:
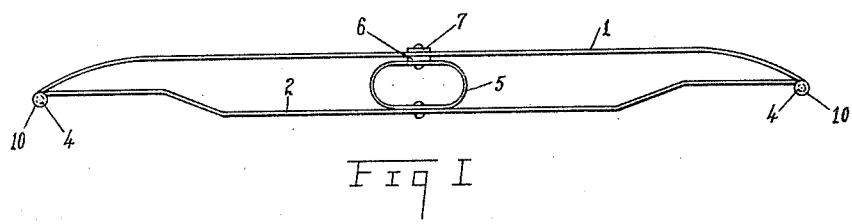
Fig. 1 is a top view of the bumper.
Figure 2:
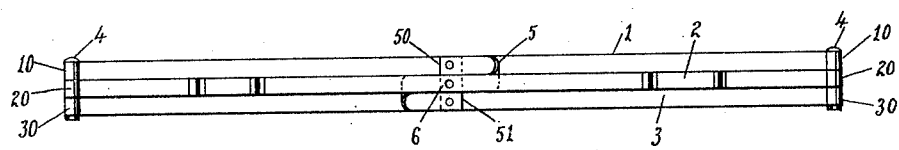
Fig. 2 is a rear view of the same.
Figures 3, 4:
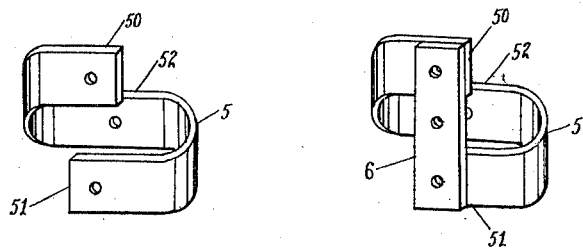
Fig. 3 is a perspective view of the connecting spring.
Fig. 4 is a similar view with a plate joining the spring ends.

The connecting spring 5, has its ends 50, 51, bent back on its middle portion 52, and bent outwardly as shown in Figure 3. The ends 50, and 51, are preferably connected by a plate 6. The middle 52, and ends 50, 51, are centrally bored to receive bolts, and the plate 6, is similarly bored.

In assembling the bumper, after the bars 1, 2, and 3, which have been centrally bored, have had their terminal eyes 10, 20, and 30, mounted on the bolts 4, the spring 5, is inserted between the front and rear bars 1, 3, and 2, and the middle portion 52, is bolted or riveted to the middle of the rear bar 2. The front bars 1, and 3, are then bolted or riveted to the ends 50, 51, through the plate 6.

A front plate 7, may also be connected by the same means or may be attached to the center of the bar 6.

With a bumper of this construction, shocks received by the front bars are absorbed to a large extent by the intermediate spring connection and the cushioning effect of the bumper is greatly increased.

The form of the spring connection is of the simplest character and very inexpensive.

With a rigid connection between the front and rear bars as hitherto employed, shocks to the central portion of the bumper were entirely borne by the rear bar, whereas with this device all the bars assist in cushioning such shocks.

What I claim is:—

1. In a bumper of the type specified, a spring connection mounted on the middle portion of the rear bar, with its ends bent forward, each of which is connected to the middle of one of the front bars.

2. In a bumper of the type specified, a spring connection mounted on the middle portion of the rear bar, with its ends bent forward and inwardly in spaced relation in a vertical plane, each of which is connected to the middle of one of the front bars, through a plate connecting the ends of the spring.

3. In a bumper, a central connecting spring having its ends bent back on its middle portion and spread vertically.

BERNARD W. P. COGHLIN.